(12) United States Patent
Bazrafkan

(10) Patent No.: US 10,303,916 B2
(45) Date of Patent: May 28, 2019

(54) IMAGE PROCESSING APPARATUS

(71) Applicant: FotoNation Limited, Galway (IE)

(72) Inventor: Shabab Bazrafkan, Galway (IE)

(73) Assignee: FotoNation Limited, Galway (IE)

( * ) Notice: Subject to any disclaimer, the term of this patent is extended or adjusted under 35 U.S.C. 154(b) by 0 days.

(21) Appl. No.: 15/220,195

(22) Filed: Jul. 26, 2016

(65) Prior Publication Data

US 2017/0032170 A1    Feb. 2, 2017

Related U.S. Application Data

(60) Provisional application No. 62/199,644, filed on Jul. 31, 2015.

(51) Int. Cl.
*G06K 9/00*    (2006.01)
*G06K 9/20*    (2006.01)

(52) U.S. Cl.
CPC ....... *G06K 9/00026* (2013.01); *G06K 9/2027* (2013.01); *G06K 2009/0006* (2013.01); *G06K 2009/00932* (2013.01)

(58) Field of Classification Search
CPC ............. G06K 9/00026; G06K 9/2027; G06K 2009/0006; G06K 2009/00932
See application file for complete search history.

(56) References Cited

U.S. PATENT DOCUMENTS

| | | | | |
|---|---|---|---|---|
| 6,292,576 B1* | 9/2001 | Brownlee | ........... | G06K 9/00006 340/5.83 |
| 7,366,331 B2* | 4/2008 | Higuchi | ............. | G06K 9/00046 340/5.53 |
| 7,386,152 B2* | 6/2008 | Rowe | .................... | A61B 5/1171 340/5.53 |
| 7,460,696 B2* | 12/2008 | Rowe | ................. | G06K 9/00046 382/115 |
| 8,175,346 B2* | 5/2012 | Rowe | ................. | G06K 9/00013 340/5.53 |
| 8,285,010 B2* | 10/2012 | Rowe | ................... | A61B 5/0059 382/115 |
| 8,731,250 B2* | 5/2014 | Martin | ............... | G06K 9/00033 382/124 |
| 8,768,015 B2* | 7/2014 | Higuchi | ............... | A61B 5/1172 382/125 |
| 2002/0094130 A1 | 7/2002 | Bruls et al. | | |

(Continued)

OTHER PUBLICATIONS

N. Miura, A. Nagasaka, and T. Miyatake, "Feature extraction of finger vein patterns based on iterative line tracking and its application to personal identification," Syst. Comput. Japan, vol. 35, No. 7, pp. 61-71, 2004.

(Continued)

*Primary Examiner* — John B Strege

(57) ABSTRACT

An image processing apparatus comprises a set of infra-red (IR) sources surrounding an image capture sensor and a processor operatively coupled to said IR sources and said image capture sensor. The processor being arranged to acquire from the sensor a succession of images, each illuminated with a different combination of the IR sources. The processor is further arranged to combine component images corresponding to the succession of images by selecting a median value for corresponding pixel locations of the component images as a pixel value for the combined image.

17 Claims, 5 Drawing Sheets

(56) References Cited

U.S. PATENT DOCUMENTS

| | | | | |
|---|---|---|---|---|
| 2011/0007951 A1* | 1/2011 | Mil'shtein | ......... | G06K 9/00033 |
| | | | | 382/124 |
| 2011/0222740 A1* | 9/2011 | Kitane | ................ | A61B 5/6838 |
| | | | | 382/115 |
| 2015/0199003 A1* | 7/2015 | Zhang | .................... | G06F 3/013 |
| | | | | 345/156 |

OTHER PUBLICATIONS

J. Yang and Y. Shi, "Towards finger-vein image restoration and enhancement for finger-vein recognition," Inf. Sci. (Ny)., vol. 268, No. 07, pp. 33-52, 2014.

P. Gupta and P. Gupta, "An accurate finger vein based verification system," Digital Signal Processing, vol. 38, pp. 43-52, 2015.

www.e-consystems.com/Monochrome-USB-Camera-board.asp, retrieved Dec. 19, 2018, 3 pages.

www.framos.com/products/en/optics/lenses/dsl945d-f2-5-15428.htm, retrieved Dec. 27, 2018, 3 pages.

www.knightoptical.com/stock/optical-components/uvvisnir-optics/filters/long-pass-filters/acrylic-longpass-filters/colour-filter-acrylic-type-25mmdia-850nm-long-pass, retrieved Dec. 19, 2018, 1 page.

K. Shin, Y. Park, D. Nguyen, and K. Park, "Finger-Vein Image Enhancement Using a Fuzzy-Based Fusion Method with Gabor and Retinex Filtering", Sensors, 2014, vol. 14, pp. 3095-3129.

M. Hung, J. Pan, C. Hsieh, and R. February, "A Fast Algorithm of Temporal Median Filter for Background Subtraction" vol. 5, No. 1, pp. 33-40, 2014.

J. Yang, "Personal identification based on finger-vein features," Comput. Human Behav., vol. 27, No. 5, pp. 1565-1570, 2011.

* cited by examiner

IMAGE PROCESSING APPARATUS

FIELD

The present invention relates to an image processing apparatus. In particular, embodiments of the invention provide an apparatus for acquiring images of a finger and for obtaining a finger vein image from the acquired images. A finger vein map can then be extracted from the finger vein image for finger vein based registration and/or authentication of a user.

BACKGROUND

One of the most convenient and secure ways of protecting electronic devices and/or electronic data is to use biometric signals for authenticating a user.

The human vein structure as a biometric signal has drawn attention in recent years, for example, as disclosed in: N. Miura, A. Nagasaka, and T. Miyatake, "Feature extraction of finger vein patterns based on iterative line tracking and its application to personal identification," Syst. Comput. Japan, vol. 35, no. 7, pp. 61-71, 2004; J. Yang and Y. Shi, "Towards finger-vein image restoration and enhancement for finger-vein recognition," Inf. Sci. (Ny)., vol. 268, no. 07, pp. 33-52, 2014; and P. Gupta and P. Gupta, "An accurate finger vein based verification system," Digital Signal Processing, vol. 38, pp. 43-52, 2015. Theoretically, vein structures should be specific for each person and so can be used as a biometrical signal.

Biometric authentication systems for consumer electronics handheld devices, such as smartphones or tablets are limited by size, cost and computational capacity.

It is an object of the present invention to provide an image processing apparatus which is suitable for incorporation into such devices.

SUMMARY

According to the present invention there is provided an image processing apparatus according to claim 1.

Embodiments of the invention use the finger vein structure in the intermediate phalange to identify or authenticate individuals. The apparatus can be readily implemented within the form factor of a handheld devices such as a smartphone or tablet.

Embodiments provide a fast and inexpensive method for extracting a clear map of a veins structure in a finger intermediate phalange. This map can then be used with a classifier for registration and/or authentication of a user.

Near-infrared (NIR) light (940 nm) illumination is used to penetrate the human tissue, based on the fact that haemoglobin highly absorbs NIR light, whereas surrounding human tissue transmits NIR light.

In embodiments, several images are taken for each finger using different combinations of NIR LEDs in different positions. An image fusion method is employed to fuse all the images, resulting in a single fused finger vein image. A vein map extraction process is used for enhancing the finger vein image and to provide the vein map.

BRIEF DESCRIPTION OF THE DRAWINGS

An embodiment of the invention will now be described, by way of example, with reference to the accompanying drawings, in which.

DESCRIPTION OF THE EMBODIMENT

Figure 1:
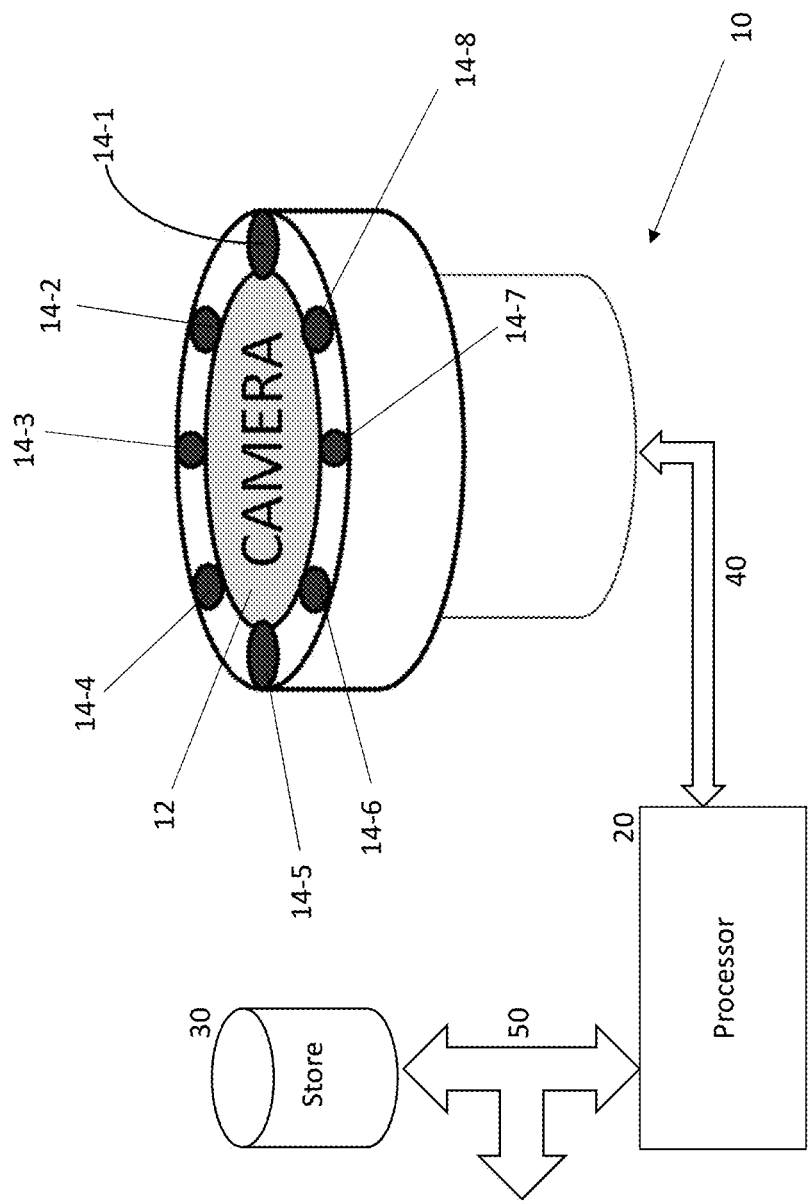
FIG. 1 illustrates schematically an image processing apparatus according to an embodiment of the present invention.

Referring now to FIG. 1, there is shown an image processing apparatus according to an embodiment of the present invention. The apparatus 10 comprises an image sensor 12 surrounded by a set of IR light sources 14-1 . . . 14-8. The sensor 12 and light sources 14 are controlled by a processor 20 which is arranged to acquire images from the sensor 12, to control illumination of the light sources 14 during successive acquisition of images by the sensor and to store acquired images in an image store 30. The processor 20 may also process acquired images to provide a finger vein map based on images acquired from the sensor 12; or alternatively the images can be provided to another processor (not shown) to complete this processing.

Each of the sensor 12, light sources 14, processor 20 and image store 30 are interconnected by busses 40, 50. It will be appreciated that in a device such as a smartphone or tablet, the processor 20 can comprise the main processor for the device or the processor can comprise a dedicated processing module coupled to the system bus for acquiring images and providing acquired images, semi-processed images, processed images or indeed a finger vein map to other processing modules of the device.

The image store 30 can be a permanent image store or the store can be a more limited size cache memory for temporary storage of acquired images. Equally the store 30 can be accessible to the processor via a local bus; or the store can be remote and accessible to the processor 20 across a network (not shown).

It will also be appreciated that although the embodiment is described as being performed by a given processor 20, it can equally be performed by discrete processors, each being arranged to perform separate processing steps.

The illustrated sensor 12 can include the necessary focusing optics mounted in front of a digital image acquisition sensor, such as a CMOS sensor. A prototype sensor comprises a See3CAM_CU51-5 MP USB 3.0 monochrome camera with a standard M12 lens holder (http://www.e-consystems.com/Monochrome-USB-Camera-board.asp) in which a DSL945D-F2.5 lens (http://www.framos.com/products/en/optics/lenses/dsl945d-f2-5-15428.html) and near infrared filter are mounted. A suitable IR filter is an acrylic type, 25 mmdia, 850 nm Long-pass filter (http://www.knightoptical.com/stock/optical-components/uvvisnir-optics/filters/long-pass-filters/acrylic-longpass-filters/colour-filter-acrylic-type-25mmdia-850nm-long-pass/).

Nonetheless, it will be appreciated that in mass production implementations of the invention, a dedicated or customised sensor 12 can be provided both to minimize cost and to reduce form factor as far as possible so that the sensor 12 and light sources 14 can be incorporated in shallow housing devices such as smartphones or tablets.

In the illustrated embodiment, the sensor 12 provides VGA (640×480) resolution images, although it will be appreciated that this resolution can be varied if required.

It will also appreciated that sensor 12 can be implemented as a dedicated IR sensor as in the example above; or alternatively, the sensor can be fabricated as an Color Filter Array (CFA) type RGB(IR) type sensor where IR sensitive pixels are interleaved within RGB pixels, so allowing the sensor to acquire both visible images and IR images and perhaps expand the functionality of the apparatus for other applications.

In any case, it will be appreciated that embodiments of the invention comprise a plurality of IR light sources 14 which surround an IR sensitive image sensor 12 so that the light sources 14 illuminate a subject, the intermediate phalange of a person's finger, from the same side as images are captured by the sensor 12.

In the illustrated embodiment, the lights sources comprise 8 NIR LEDs 14 distributed in a circular arrangement around the image sensor 12, however, it will be appreciated that the light sources 14 need not necessarily be in a circular pattern; need not be uniformly distributed; and that different numbers of sources for example, between 6 and 12, can be used. Equally, while the LEDs are illustrated as discrete components, these could also be produced in an integrated fashion.

In use, a user places a portion of one finger on the device so that the finger portion is within the field of view of the sensor 12. In one embodiment, a sequence of images are captured either in response to detecting a finger in front of the sensor or in response to other user interaction with the device, with each image being illuminated by a combination of the LEDs 14. In one embodiment, a sequence of N images, where N is equal to the number of LEDs, is captured, with each image being illuminated by a respective LED. In variants of the embodiment, however, a sequence of N/2 images could be captured with each image being illuminated by diametrically opposite pairs of LEDs, and indeed other combinations are possible.

In any case, the sequence of images are preferably captured quickly enough to avoid movement of the finger during the capture of the sequence of images and so as to avoid the need to subsequently align images in software before further processing. Nonetheless, it will be appreciated that such alignment of images could be performed if preferred.

Since human tissue is transparent to NIR light and haemoglobin absorbs NIR light, veins can appear as shadows in correctly illuminated captured images. A problem arises however, in that to correctly expose some portions of the image from a peripheral source, some portions of the image will be over-exposed, whereas others will be under-exposed.

Figure 2:
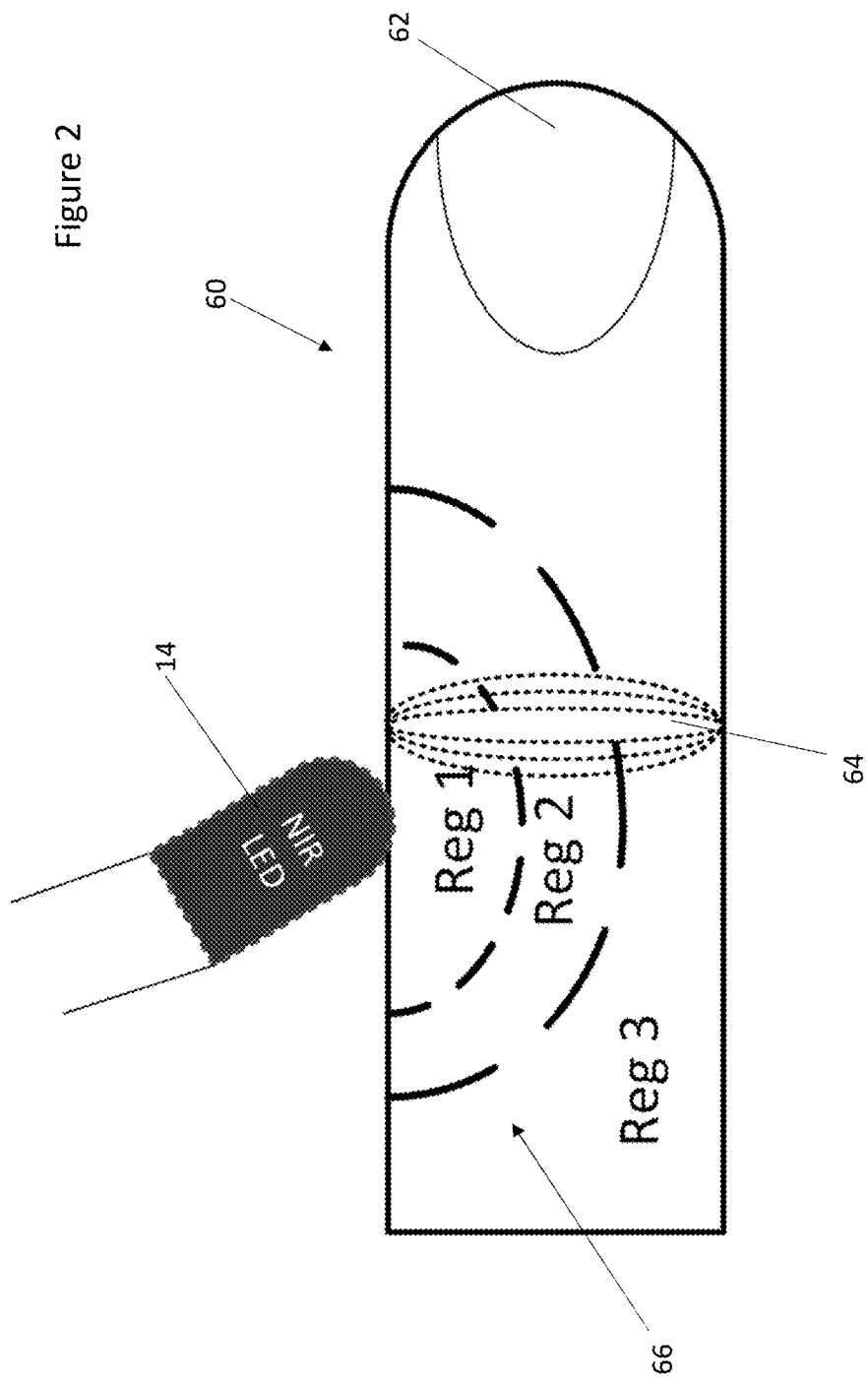
FIG. 2 illustrates the illumination of a portion of a finger by one of the light sources of the apparatus of FIG. 1.

Referring now to FIG. 2, which shows schematically a portion of a finger 60 having a nail 62 and a knuckle 64 behind which lies the intermediate phalangeal region 66 being illuminated by one source 14 from the set of sources surrounding the image sensor 12. The acquired image can be divided into three main regions:

1. Region 1: The intensity of backscattered light is too high which drives CMOS sensor to the saturation level and the image in this region will be all white (highest level).

2. Region 2: In this region the backscattered light intensity is good enough to generate the image of the veins contrasting with the remaining tissue of the finger i.e., it is not too high to saturate the sensor and not too low as in region 3.

3. Region 3: In this region the amount of light intensity is too low to actually stimulate the image sensor 12 to generate a proper image.

Embodiments of the present invention, capture several images for same finger illuminated by different combinations of light sources 14. Therefore each captured image will have a different illumination from a different direction. Region 2 is extracted from the captured images to provide a combined image covering the required area of the finger. A vein map can then be extracted for the user to allow the user to be subsequently registered and/or authenticated.

It will be appreciated, however, that determining a threshold line between regions 1, 2 and 3 in order to isolate region 2 is not a trivial task.

In one embodiment, explicitly determining such a threshold is avoided as follows:

Each of the images acquired under illumination by the different LEDs is high pass filtered.

Figures 3, 4:
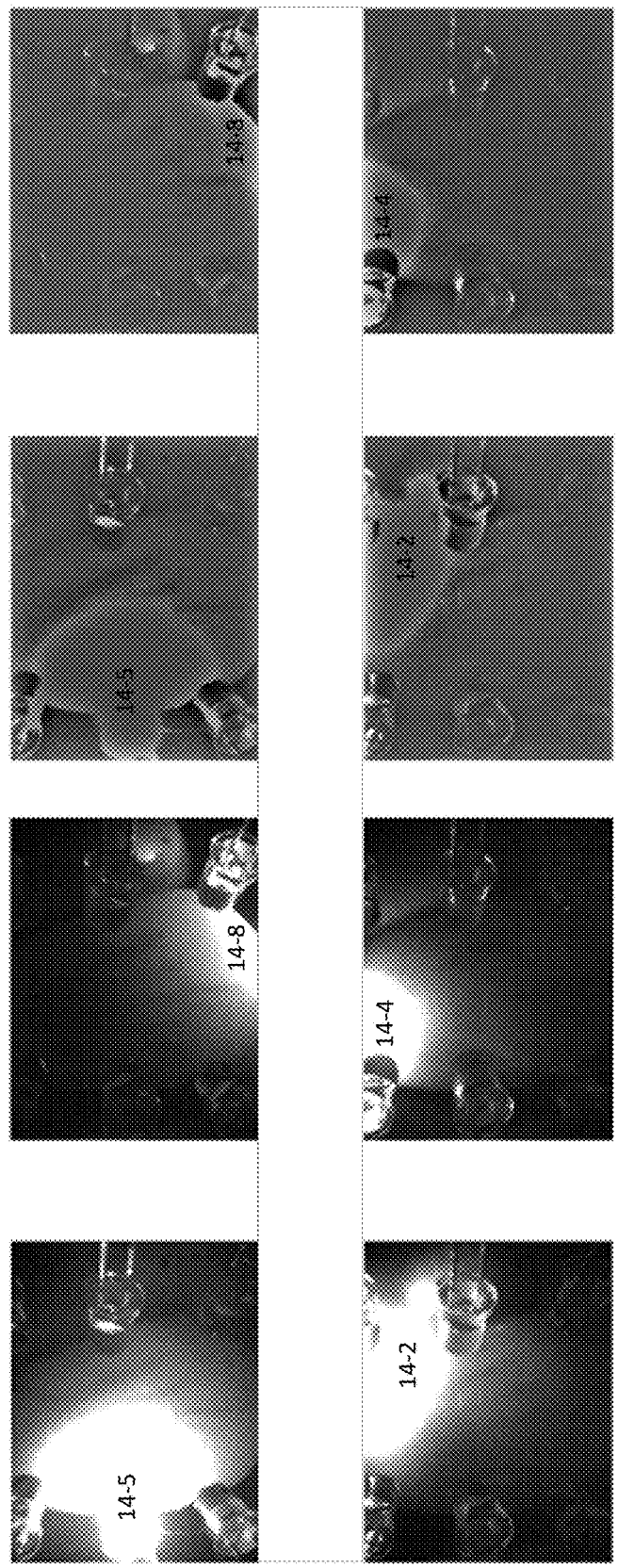
FIG. 3 shows a sample set of images acquired with illumination by different ones of the light sources of the apparatus of FIG. 1.
FIG. 4 shows high pass filtered versions of the images of FIG. 3.

FIG. 3 shows 4 images acquired through illuminating sources 14-5, 14-8, 14-2 and 14-4 from FIG. 1 respectively. Saturated regions immediately surrounding the light sources are readily visible as well as poorly illuminated regions located away from the sources providing little contrast between vein structure and the remaining tissue.

FIG. 4 shows the images after they have been high pass filtered with a Gaussian high-pass filter having a cut-off frequency set to 0.008 of the highest frequency within the images. This high pass filtering removes the low frequency component which corresponds to the gradient in illumination extending away from the light source and so tends to flatten the dynamic range of the images.

Next, the intensity values for the filtered images of all obtained images can be normalized to produce values in the range [0,1]. This means that when combined as explained below, the contribution from each normalised image will be weighted equally.

Figure 5:
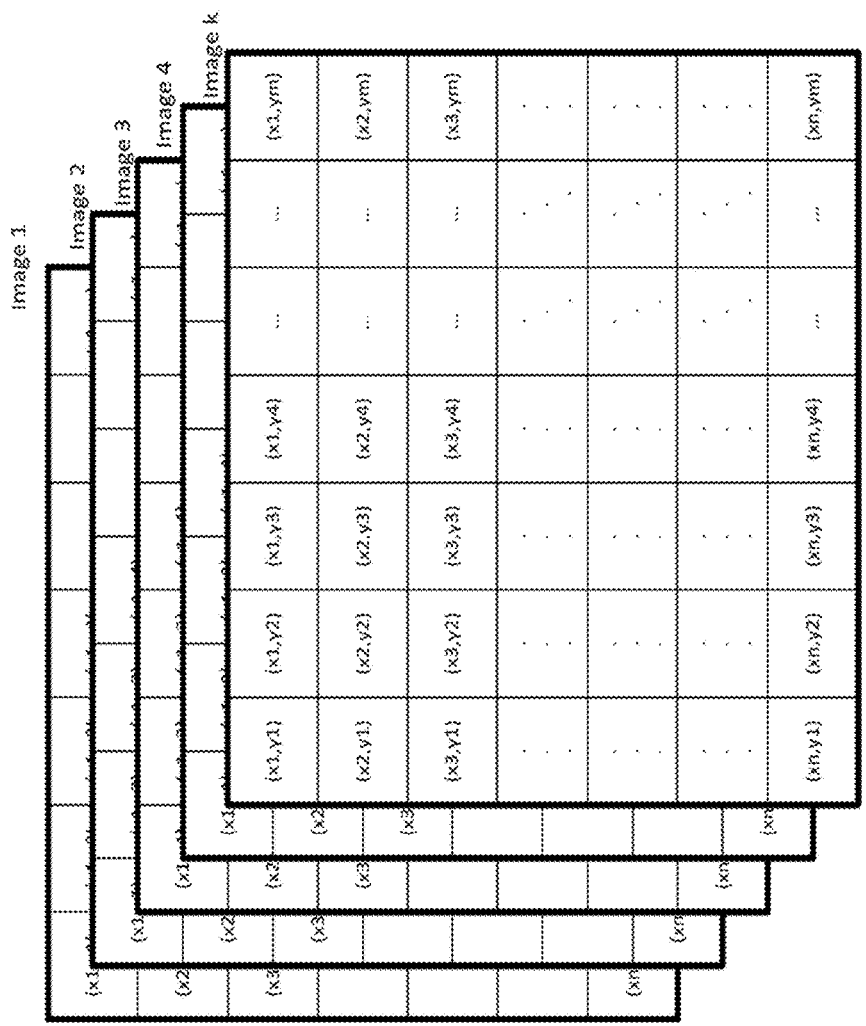
FIG. 5 shows a matrix of images acquired by the apparatus of FIG. 1.

After normalisation, a 3D matrix of images is available to the processor. Referring now to FIG. 5 which shows a matrix comprising k such images. As indicated above, if the images are acquired quickly enough to avoid finger movement; and/or the images are aligned, the matrix will comprise a set of spatially aligned images of a finger.

These images are combined to provide a fused image by applying a median filter across the matrix of images. This involves picking the median value for corresponding pixels within the matrix to provide the pixel value for the fused image. For example, to determine the value for pixel (x3,y1) in the fused image, the median values for the corresponding pixels within the normalised images is chosen.

This technique is known as 3D temporal median filtering and has already been used for image sequence noise filtering, as disclosed in R. P. Kleihorst, "Noise filtering an image sequence" 1994 and background subtraction as disclosed in M. Hung, J. Pan, C. Hsieh, and R. February, "A Fast Algorithm of Temporal Median Filter for Background Subtraction" vol. 5, no. 1, pp. 33-40, 2014.

In variants of the above scheme, the temporal median filter could be applied in a cascaded fashion to obtain better results i.e., g different sets of captured images can be passed through a 3D temporal median filter with g intermediate fused images being generated. A 3D temporal median filter is again applied to these g intermediate fused images to obtain a final fused image.

In any case, median filtering helps to extract regions which contain vein structure that are repeated in several captured images. The fused image derived from the 3D temporal median filter contains the information of all region 2s for all combinations of light sources.

Figure 6:
FIG. 6 shows a median filtered combination of a high pass filtered set of images acquired by the image processing apparatus of FIG. 1.

FIG. 6 illustrates a fused image derived from the median filtered combination of the high-pass filtered and normalised versions of the originally acquired images.

Now with the fused finger vein image such as shown in FIG. 6, a finger vein map can be produced through appropriate post-processing.

One post-processing approach comprises applying a Gabor filter to the fused finger vein image such as shown in FIG. 6. Gabor filters has been used to extract finger vein structures as described in J. Yang and Y. Shi above; and J. Yang, Y. Shi, and J. Yang, "Personal identification based on finger-vein features," Comput. Human Behav., vol. 27, no. 5, pp. 1565-1570, 2011; and K. Shin, Y. Park, D. Nguyen, and K. Park, Finger-Vein Image Enhancement Using a Fuzzy-Based Fusion Method with Gabor and Retinex Filtering, vol. 14, no. 2. 2014.

One exemplary implementation of Gabor filter bank comprises the following steps:

1. A Gabor filter is applied to the fused finger vein image, for example, for I=24 different directions.
2. A 3D temporal median filter, such as described above, is applied to these I different images.
3. Steps 1 and 2 are repeated for p=5 different frequencies, for example, [0.0250 0.0270, 0.0290, 0.0310, 0.0330] Hz of Gabor bank.
4. The mean of these p images then comprises the vein map.

Figure 7:
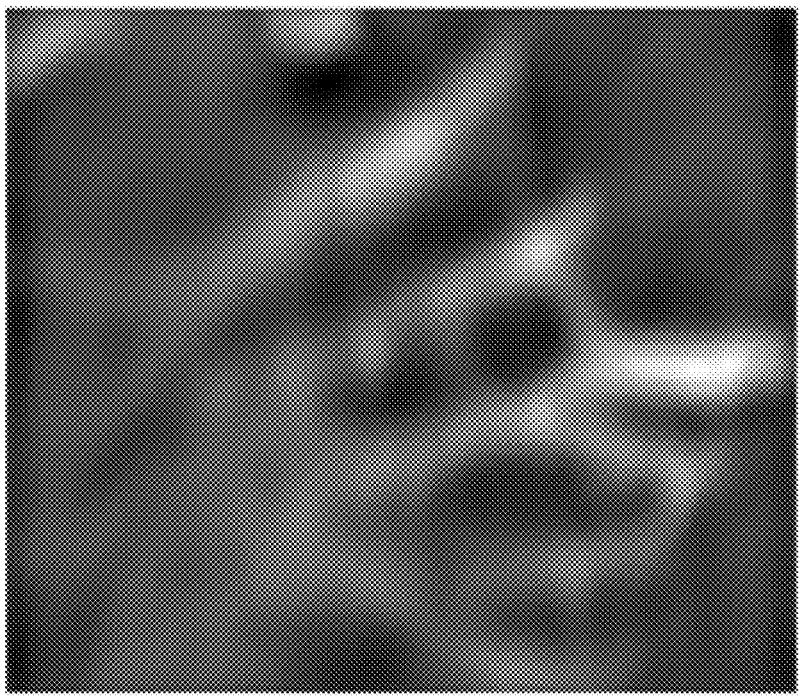
FIG. 7 shows a Gabor filter bank filtered version of the image of FIG. 6.

An exemplary vein map extracted from the fused finger vein image of FIG. 6 according to the above steps is shown in FIG. 7.

This vein map can then either be stored for a user registering their finger vein image; or compared with one or more stored vein maps for authenticating an unknown user to a device or an application running on a device.

In variations of the above described embodiments, illumination sources 14-1 to 14-8 could comprise polarised LEDs, together with a polariser placed over or within the camera lens, optimised to reduce reflections from the skin, for example using the concept of cross-polarisers.

The invention claimed is:

1. An image processing apparatus comprising:
    an image capture sensor;
    a set of infra-red (IR) sources surrounding the image capture sensor; and
    a processor operatively coupled to said IR sources and said image capture sensor and configured to acquire from the sensor a succession of images, each image illuminated with a different combination of the IR sources such that each in a plurality of the images is captured with illumination from a different direction, the processor being further arranged to combine component images corresponding to the succession of images by selecting a median value for corresponding pixel locations of said component images as a pixel value for the combined image, where the processor arranged to perform 3D temporal median filtering in a cascaded fashion to obtain g sets of cascaded images which are passed through a median filter with g intermediate fused images generated and combined into said combined image.

2. An image processing apparatus as claimed in claim 1 wherein said processor is arranged to acquire each of said succession of images with a high-pass filter to compensate for an illumination gradient across said succession of images from respective illuminating light sources.

3. An image processing apparatus as claimed in claim 2 wherein said processor is further arranged to normalise said images processed with said high-pass filter so that pixel values of said component images are in the range [0,1].

4. An image processing apparatus as claimed in claim 1 wherein said processor is further arranged to apply a Gabor filter bank to said combined image to provide a finger vein map.

5. An image processing apparatus as claimed in claim 1 wherein said processor comprises a processor for a consumer electronic device.

6. An image processing apparatus as claimed in claim 1 wherein said processor comprises at least one dedicated processing module within a consumer electronic device.

7. An image processing apparatus as claimed in claim 1 wherein said apparatus comprises 12>N>6 light sources.

8. The image processing apparatus of claim 7 wherein said processor is configured to capture a succession of N images, each lit by one or more different light sources.

9. An image processing apparatus as claimed in claim 1 wherein said processor is further arranged to spatially align said succession of images.

10. An image processing apparatus as claimed in claim 1 wherein each light source comprises an NIR LED.

11. An image processing apparatus as claimed in claim 1 further comprising an image store for at least temporarily storing said succession of images and/or said combined image.

12. An image processing apparatus as claimed in claim 1 wherein the processor is further arranged to combine respective sets of component images corresponding to plural sets of acquired images by selecting a median value for corresponding pixel locations of said component images as a pixel value for a respective intermediate combined image, the processor being arranged to combine said intermediate combined images by selecting a median value for corresponding pixel locations of said intermediate combined images as a pixel value for a final combined image.

13. A consumer electronic device incorporating the image processing apparatus according to claim 1 and being arranged to employ said image processing apparatus to register a user with an application and/or said device and to authenticate a user to an application and/or said device.

14. The image processing apparatus of claim 4 where said processor is further arranged to apply the Gabor filter bank to a fused finger vein image for I different directions, applying the 3D temporal median filter to I different images, and repeating the foregoing steps for p different frequencies.

15. The image processing apparatus of claim 14 where I=24.

16. The image processing apparatus of claim 14 where p=5.

17. The image processing apparatus of claim 16 where the different frequencies are 0.0250 Hz, 0.0270 Hz, 0.0290 Hz, 0.0310 Hz and 0.0330 Hz.

* * * * *